350-263 SR

2/9/88 OR 4,723,834

United States Patent [19]

Van de Venne et al.

[11] Patent Number: 4,723,834

[45] Date of Patent: Feb. 9, 1988

[54] PASSIVE DISPLAY DEVICE

[75] Inventors: Joannes L. M. Van de Venne; Hendrik Veenvliet, both of Eindhoven, Netherlands

[73] Assignee: U.S. Philips Corporation, New York, N.Y.

[21] Appl. No.: 795,012

[22] Filed: Nov. 4, 1985

[30] Foreign Application Priority Data

Nov. 21, 1984 [NL] Netherlands ........................ 8403536

[51] Int. Cl.[4] ............................................ G02D 25/00

[52] U.S. Cl. .................................... 350/269; 340/763; 340/786

[58] Field of Search .................. 340/763, 786; 350/269

[56] References Cited

U.S. PATENT DOCUMENTS 3,924,228 12/1975 Goodrich ............................ 340/763

4,519,676 5/1985 Te Velde ........................ 340/763 X

*Primary Examiner*—Alexander R. Thomas

*Attorney, Agent, or Firm*—Norman N. Spain

[57] ABSTRACT

A passive display device comprising a first and a second supporting plate at least one of which is transparent, a number of display elements for controlling the reflection or transmission of light each having at least one fixed electrode and an electrode which is movable with respect to said electrode by electrostatic forces and which is kept separated from the fixed electrode by means of at least one electrically insulating oxidic layer, the insulating oxidic layer comprising a layer of a compound which comprises a polar and a non-polar group and the polar group of which is adsorbed or linked to the surface of the insulating oxidic layer.

5 Claims, 3 Drawing Figures

PASSIVE DISPLAY DEVICE

BACKGROUND OF THE INVENTION

The invention relates to a passive display device comprising a first and a second supporting plate at least one of which is transparent, a number of display elements for controlling the reflection or transmission of light each display element having at least one fixed electrode and an electrode which is movable with respect to said electrode by electrostatic forces and which is kept separated from the fixed electrode by means of at least one electrically insulating, oxidic layer.

A passive display device is to be understood to mean herein a display device of which the display elements themselves do not produce any light but reflect or transmit the ambient light in such a manner that a picture is obtained.

A passive display device of the above-mentioned electrostatic type is known, for example, from Netherlands Patent Application No. 7510103 in the name of the Applicants published on Mar. 1, 1977 and corresponding to U.S. Pat. No. 4,178,077, the published European Patent Application No. 85459 also in the name of the Applicants and "SID International Symposium Digest of technical papers", April, 1980, pp. 116–117. The movable electrode in each display element can be moved between two stable positions so that for light incident on the display device the transmission or reflection can be controlled per display element. The movable electrode is connected to one of the supporting plates by means of a number of resilient elements. The forces which urge the movable electrode from one stable position to the other are electrostatic forces whether or not combined with the resilient forces generated in the resilient elements.

In a first embodiment of the display device the movable electrode is moved between two fixed electrodes provided on the first and on the second supporting plate respectively. The resilient forces occurring in the resilient elements are usually negligible with respect to the electrostatic forces.

In a second embodiment of the display device the electrostatic forces urge the movable electrode from one stable position to the other and the resilient forces in the resilient elements are used to cause the electrode to return to its initial position. In both embodiments forming of a short-circuit between the movable electrode and a fixed electrode is prevented by an electrically insulating layer between said electrodes.

In its commonest form the first embodiment (also indicated by the term "three-electrode-system"), also comprises the second embodiment. In this commonest form the overall forces $F_t$ acting on the movable electrode may in fact be written as $F_t=F_1+F_2+F_3$, wherein $F_1$ is the electrostatic force between the movable electrode and one fixed electrode; $F_2$ is the electrostatic force between the movable electrode and the other fixed electrode, and $F_3$ is the mechanical resilience generated in the resilient element. From the formula given for $F_t$ various embodiments of the display device may be derived. In the case in which $F_3$ is negligibly small with respect to the terms $F_1$ or $F_2$ the movable electrode is moved substantially by means of electrostatic forces. In the case in which $F_1$ or $F_2$ is equal to zero, the above-indicated second embodiment is obtained.

The display device is suitable for operation in the reflection mode as well as in the transmission mode. When operating in the reflection mode the display device is filled with a liquid the color of which contrasts with the color of the surface of the movable electrode which faces the light incident on the display device. Dependent on the stable position the movable electrode is in, the display element in question will assume for the observer the color of the surface of the movable electrode or the color of the contrasting liquid. In this manner a picture can be built up by means of the picture elements.

When operating in the transmission mode, each display element forms a controllable light shutter. The construction then is, for example, such that the movable electrode comprises a pattern of light-pervious areas and that the fixed electrode on one of the supporting plates comprises a pattern of light transmitting areas which is the negative of that of the movable electrode. No light is transmitted if both electrodes are substantially in one plane.

In each embodiment an electrically insulating oxidic layer is provided between the movable electrode and the fixed electrode(s) as a result of which short-circuiting between the electrodes is prevented. The electrically insulating layer may be provided, for example, on the surface of the fixed electrode(s). The insulating layer may alternatively be provided on one or on both surfaces of the movable electrode or both on the fixed and on the movable electrodes. The electrically insulating oxidic layer is, for example, a layer of a metal oxide, for example $TiO_2$. A very suitable and frequently used insulating layer is also a layer of $SiO_2$ provided by means of a plasma CVD (Chemical Vapour Deposition) process.

When using the display device, for example a display device having a three-electrode-system, voltage pulses of +V and −V, respectively, are applied to the fixed electrodes, i.e. the fixed upper electrode and the fixed lower electrode, while a variable voltage pulse Vg is simultaneously applied to the movable electrode. If the voltage at the movable electrode is approximately −V the movable electrode will be repelled by the fixed lower electrode and be attracted by the fixed upper electrode. The movable electrode will then move adjacent to the fixed upper electrode. When a voltage of approximately +V is applied to the movable electrode, the movable electrode will move from the fixed upper electrodes to the fixed lower electrode.

Experiments performed by Applicants have demonstrated that when driving display elements in such a manner that the movable electrode would have to move from one stable position to the other stable position, such a movement sometimes does not occur or occurs only at a voltage applied to the movable electrode which is considerably larger than the theoretically required voltage.

In the non-prepublished previously filed Netherlands Patent Application No. 8402201 (PHN 11 103) in the name of the Applicants it is pointed out that the resistance experienced by the movable electrode when detaching from or approaching an engaging surface, i.e. insulating lager, is an important factor. It is stated more particularly that, upon detaching and approaching, the free space between the movable electrode and the engaging surface determines the value of the aerodynamic or hydrodynamic resistance to a considerable extent. It is suggested in the above-mentioned Netherlands Patent Application that the movable electrode and the engaging surface(s) be given different surface structures.

SUMMARY OF THE INVENTION

It is the object of the present invention to provide a display device in which the above-mentioned problems as regards the movement of the movable electrode are considerably reduced.

According to the invention this object is achieved by means of a passive display device of the type mentioned in the opening paragraph which is characterized in that the insulating oxidic layer comprises a layer of a compound which has a polar and a non-polar group the polar group of which is adsorbed or linked to the surface of the insulating oxidic layer.

The invention is based on the recognition of the fact that active places are present or are generated on the surface of the electrically insulating oxidic layer, at which places electric changes are adsorbed. As a result of said charges extra adhesive forces are obtained as a result of which notably the removal or rather the detaching of the movable electrode from the engaging surface is considerably impeded or even prevented in practice.

The object of the measure according to the invention is to deactivate or mask said active places on the surface of the electrically insulating layer.

The active places on the surface of the insulating layer are mainly hydroxyl groups. The polar group of the compound used in the display device according to the invention shows an interaction, for example a physical absorption or chemical reaction, with the hydroxyl groups of the insulating layer.

As a result of this the hydroxyl group is screened so that the insulating layer can no longer absorb an electrical charge.

DETAILED DESCRIPTION OF THE INVENTION

Figure 1:
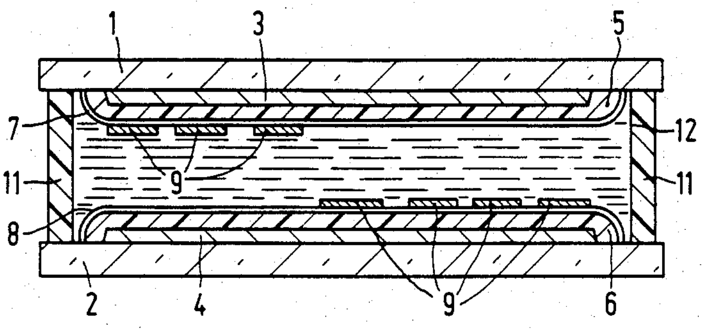
FIG. 1 is a cross-sectional view of a passive display device according to the invention.

An example of a suitable compound is a surface-active substance, for example an alkyl sulphonate or an alkyl ammonium salt. Such a substance is physicaly adsorbed at the insulating layer. The physical absorption of a surface-active substance is always an equilibrium phenomenon in which a finite (albeit small) concentration of the substance is prevent in the display medium. It is recommendable for the display medium to be as free as possible from alien constituents. Therefore compounds are to be preferred which react chemically with the hydroxyl groups of the electrically insulating layer. An example of a chemical coupling is the conversion of the hydroxyl groups of the insulating layer into chlorine atoms by means of a chlorinating process succeeded by reaction with an alkyl lithium compound in which in the case of an $SiO_2$-insulating layer, the Si-atom is coupled directly to a carbon atom of the alkyl group.

Another example is the reaction of the hydroxyl groups of the insulating layer with substances containing alkyl groups or aryl groups, the alkyl group or aryl group of which is substituted with chlorine. An Si-atom of the insulating layer is coupled via an oxygen atom to the substance containing the alkyl group of aryl group.

In a preferred form of the display device the insulating oxidic layer comprises an alcohol or a silane compound bound chemically to the surface.

A suitable alcohol is an aliphatic alcohol, in particular an alkyl alcohol (alkanol) the alkyl group of which comprises at least 8 carbon atoms. The alkyl group usually contains not more than 19 carbon atoms. Examples of suitable alcohols are decanol, dodecyl alcohol, hexadecyl alcohol and octadecyl alcohol. An Si-OH group present at the surface of an $SiO_2$ insulating layer reacts with the hydroxyl group of the alcohol, an Si—O—C group being formed. A monolayer of the aliphatic alcohol is formed on the insulating layer. In the resulting screening layer polar or other reactive constituents are not present so that a second layer cannot be provided in an adhering manner on the first layer of the alcohol bound to the surface. So it concerns a real monolayer having an entirely inert surface. The layer is provided, for example, by dipping the display device in the alcohol. The reaction is preferably carried out at elevated temperature, for example 50°-200° C. A small quantity of an acid, for example 1% sulphuric acid, may also be added. The acid serves as a catalyst as a result of which the esterification reaction between the SiOH-groups of the insulating layer and the OH groups of the alcohol is accelerated. Instead of an aliphatic alcohol a fluorine-substituted aliphatic alcohol having 2-12 carbon atoms, for example hexafluoroethanol, may also be used.

Very good results are obtained if a silane compound is used in the display device according to the invention. Suitable silane compounds are bi- or trifunctional silanes which comprise per molecule two or three active atoms, in particular chlorine atoms or active groups, in particular alkoxy groups, which are capable of reacting with the hydroxyl groups of the insulating layer and thus produce a bond. In addition to the active atoms or groups the silane comprises one or two alkyl groups of a phenyl group. Examples hereof are methyl trichlorosilane, methyl triethoxy silane, dimethyl diethoxy silane and dimethyl dichloro silane. The chlorine atoms of the silane are particularly reactive and react with the hydroxyl groups of the insulating layer while forming an —O—Si bridge and splitting off HCl. The alkoxy groups are less reactive. An alkoxy silane must be incorporated in an aqueous medium, the alkoxy group being saponified to a hydroxyl group which then reacts with a hydroxyl group of the insulating layer while forming a —O—Si bridge.

The silane compound may be provided on the insulating layer from a solution. For this purpose, in the case of a silane compound which comprises a halogen atom, for example a chlorine atom, the substance is dissolved in a non-polar organic solvent, for example toluene, hexane or benzene. The concentration is, for example, from 0.1 to 1% by volume. A basic catalyst, for example an amine, is added to the solution. An example of a suitable catalyst is pyridine in a concentration of 0.1% by volume. The solution may be provided on the insulating layer by a moulding or spraying process. The display device may alternatively be dipped in the solution. After this treatment, rinsing is carried out first with, for example, toluene, and then with a polar solvent, for example an alcohol, in order to remove the polar reaction products and notably the formed pyridine HCl salt.

A silane compound with an alkoxy group may also be provided from a solution. The solvent must be water or contain water. As a result of this the alkoxy silane compound is hydrolysed to form a hydroxy silane compound which has a sufficient reactivity vis-à-vis the hydroxyl groups of the substrates.

The insulating layer in the display device in accordance with the invention is preferably provided with a monofunctional silane compound which satisfies the formula I

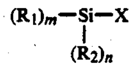

wherein

- $R_1$ is an alkyl group or a cycloalkyl group having at least 4 carbon atoms which may be substituted with fluorine,
- $R_2$ is an alkyl group or a cycloalkyl group having 1 to 3 carbon atoms which may be substituted with fluorine,
- X is a halogen atom or an alkoxy group having 1–2 carbon atoms,
- m has the value 1–3,
- n has the value 0–1, and
- $m+n=3$.

The use of such a monofunctional substance provides an accurately defined monolayer with an excellent screening effect.

In a preferred form of the invention the silane compound satisfies formula II

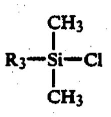

in which formula $R_3$ is an alkyl group or a cycloalkyl group having at least 8 carbon atoms.

Examples of excellently active silane compounds are octyl dimethyl chlorosilane, dodecyl dimethyl chloromethyl silane and decyl dimethyl ethoxysilane.

When a silane compound is used which comprises one long alkyl group having four or more carbon atoms and two short alkyl groups, for example methyl groups, a comparatively high population degree is achieved. Dependent on the length of the long alkyl group a population degree of 30–70%, for example 40% is reached. This means that two hydroxyl groups out of the five hydroxyl groups per 100 $Å^2$ of an $SiO_2$ substrate have reacted with the silane compound.

Figure 3:
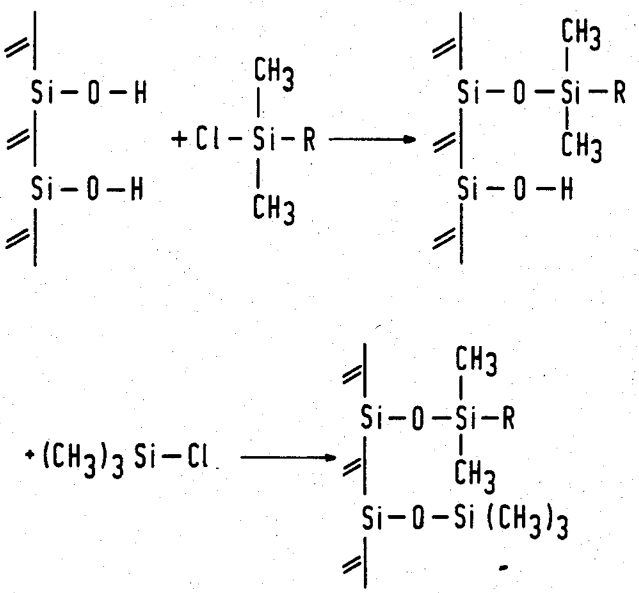
FIG. 3 is a reaction scheme according to the invention.

The reaction of the silane compound used according to the invention with the hydroxyl groups of an $SiO_2$ insulating layer is shown in FIG. 3 of the drawing.

As appears from FIG. 3, according to the invention a monomolecular layer is obtained which does not contain any active groups any longer not counting the remaining hydroxyl groups of the insulating layer.

In a further preferred form of the invention, after the use of a compound of formula I or II, the insulating layer is post-treated with trimethyl chlorosilane.

This latter substance has small dimensions. As a result of this the substance can penetrate between the long alkyl chain of a compound of formula I or II, reach the surface of the insulating layer and react with the hydroxyl groups still present as shown in FIG. 3. The uniformity of the surface is increased hereby and as a result of this the quality of the screening effect is improved.

Embodiments of the invention will now be described in greater detail, by way of example, with reference to the drawing The device comprises two parallel supporting plates 1 and 2 of which at least supporting plate 1 is transparent. The supporting plates 1 and 2 are, for example, made of glass or another material. A transparent electrode 3 is provided on the supporting plate 1. Strip-shaped electrodes 4 are provided on supporting plate 2. The electrodes 3 and 4 have a thickness of approximately 0.2 μm and are manufactured, for example, from indium oxide and/or tin oxide. 1 to 2 μm thick electrically insulating layers 5 and 6 of quartz are provided on the electrodes 3 and 4. The quartz ($SiO_2$) layers 5 and 6 comprise extremely thin monolayers 7 and 8 of a silane compound in a thickness of, for example, 3 nm. For this purpose supporting plate 1 with electrode 3 and $SiO_2$ layer 5 as well as supporting plate 2 with electrode 4 and $SiO_2$ layer 6 are dipped in a 0.5% solution of n-dodecyl dimethyl chlorosilane in toluene. 0.1% by volume of pyridine had been added to the solution. The solution was refluxed for 45 minutes. The supporting plates were removed and rinsed in toluene. The plates were then dipped in a 0.5% solution of trimethyl chlorosilane in toluene to which 1.5% by volume of pyridine had been added. The solution was boiled for 30 minutes and then cooled. The plates were removed, rinsed in toluene and ethanol and then dried. The silane compounds used reacted with the hydroxyl groups present on the $SiO_2$ surface as is shown in formula III. The active places on the $SiO_2$ surface are deactivated by it so that no charge is adsorbed at this surface. Layers of other mono-, di- and trifunctional silane compounds as described in the preamble, as well as layers of the above-mentioned alcohols and surface-active substances also deactivate the hydroxyl groups of the insulating layer so that no charge adsorption takes place any longer.

Figure 2:
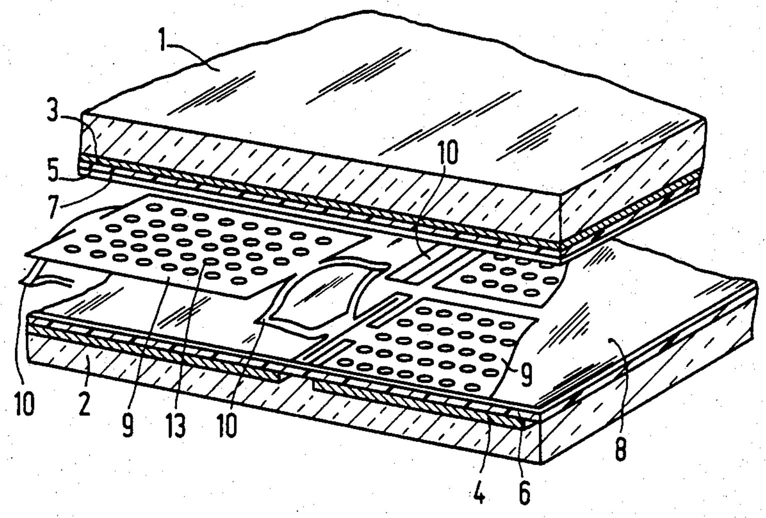
FIG. 2 is a perspective view, partially broken away, of the device shown in FIG. 1.

The display device furthermore comprises a number of movable electrodes 9 having holes 13 which are connected to the insulating layer 6 by means of a number of resilient elements 10 (FIG. 2). The electrodes 9 are interconnected in one direction by means of their resilient elements 10 and constituent strip-like electrodes crossing the electrodes 4 substantially at right angles. At both major surfaces the electrodes 9 comprise a very thin $SiO_2$ layer in a thickness of 5 to 10 nm, not shown. This layer has a silane compound in exactly the same manner as described hereinbefore with regard to the $SiO_2$ layers 5 and 6. The thin monolayer of the silane compound is not shown in the figures. The surface of the electrodes 9 facing the transparent supporting plate 1 is reflecting. The device is sealed by a rim of sealing material 11. The space between the supporting plates 1 and 2 is filled with an opaque non-conductive liquid, the colour of which is contrasting with the diffusion-reflecting colour of the electrodes 9. The liquid 12 is formed, for example, by a solution of sudan-black in toluene. By applying voltages to the electrodes 3, 4 and 9 the electrodes 9 can be controlled from one stable state to the other. When the electrodes 9 are present against the insulating layer 5 with silane layer 7, the ambient light is reflected by the electrodes 9. When the electrodes 9 are present against the insulating layer 6 with silane layer 8, the electrodes 9 on the observation side are not visible via the transparent supporting plate and the ambient light is absorbed by the liquid 12 or at least is reflected only in the color of the liquid 12. The device forms a so-called matrix display device in which the strip-like electrodes 4 constitute, for example, the row electrodes and the strip-shaped electrodes 9 constitute the column electrodes of the device.

Recording the picture starts from the condition in which all the electrodes 9 are present on the side of the second supporting plate 2. The row electrodes 4 and the common electrode 3 are kept at a voltage $+V$ and $-V$, respectively. The information for a controlled electrode 4 is simultaneously presented to all column electrodes. Voltage pulses Vg of $+2$ V are applied to the column electrodes the electrode 9 of which at the crossing with the controlled row electrode 4 must flip to the first supporting plate 1, while voltage pulses of 0 V are applied to the remaining column electrodes. After recording, all electrodes 9 can be moved again to the second supporting plate 2 by simultaneously bringing all column electrodes at $-V$ volt for a short period of time. The function of the insulating layers is threefold. First they prevent electric contact between the movable electrodes 9 and the fixed electrodes 3 and 4. The second function relates to the energy consumption of the display device. When the electrode 9 is urged against one of the said layers, an energy proportional to $1/d$ will be applied with every alternating voltage pulse, d being the thickness of the dielectric layer. The third function of the insulating layer relates to the switching properties of the display device. At an extremely low layer thickness of the dielectric layer ($d \rightarrow 0$), switching must be carried out exactly at the points $+V$ volt and $-V$ volt to cause the movable electrode to move from one position to the other. For practical reasons this is substantially impossible. Some thickness of the dielectric layer presents some relief because the range within which switching can be carried out is expanded.

What is claimed is:

1. A passive display device comprising a first and a second supporting plate at least one of which is transparent, a number of display elements for controlling the reflection or transmission of light each having at least one fixed electrode and an electrode which is movable with respect to said electrode by electrostatic forces and which is kept separated from the fixed electrode by means of at least one electrically insulating oxide layer, characterized in that the insulating oxide layer is provided with a layer of a compound which has a polar and a non-polar group the polar group of which is adsorbed or linked to the surface of the insulating oxide layer.

2. A passive display device as claimed in claim 1, characterized in that the insulating oxide layer has an alcohol or silane compound bound chemically to a surface thereof.

3. A passive display device as claimed in claim 2, characterized in that the insulating oxidic layer has a monolayer of a compound which satisfies formula I

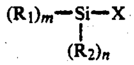

in which $R_1$ is an alkyl group or a cycloalkyl group having at least four carbon atoms which may be substituted by fluorine, $R_2$ is an alkyl group or a cycloalkyl group having 1 to 3 carbon atoms which may be substituted with fluorine, X is a halogen atom or an alkoxy group having 1-2 carbon atoms, m has the value 1-3, n has the value 0-2, and $m+n=3$.

4. A passive display device as claimed in claim 3, characterized in that the compound satisfies formula II

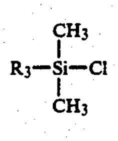

wherein $R_3$ is an alkyl group or a cycloalkyl group having at least 8 carbon atoms.

5. A passive display device as claimed in claim 3, characterized in that the monolayer is treated with trimethyl chlorosilane.

* * * * *